United States Patent
Nastke et al.

(10) Patent No.: US 6,429,165 B1
(45) Date of Patent: Aug. 6, 2002

(54) POLYMER-BONDED MATERIAL

(75) Inventors: Rudolf Nastke, Bergholz-Rehbrucke; Gerald Rafler; Helmut Remde, both of Potsdam; Thomas Krugerke, Berlin; Gabriele Stadermann, Berlin; Jannett Kohls, Berlin; Martin Kurth, Berlin; Dieter Lubkoll, Berlin, all of (DE)

(73) Assignee: Auergesellschaft GmbH, Berlin (DE)

( * ) Notice: Subject to any disclaimer, the term of this patent is extended or adjusted under 35 U.S.C. 154(b) by 0 days.

(21) Appl. No.: 09/428,011

(22) Filed: Oct. 27, 1999

Related U.S. Application Data

(62) Division of application No. 09/161,357, filed on Sep. 25, 1998, now Pat. No. 6,083,439.

(51) Int. Cl.[7] .......................... B01J 31/00; B01J 20/10; C08L 77/00; B01D 24/00; A62B 7/08
(52) U.S. Cl. ...................... 502/159; 502/162; 502/401; 502/402; 502/413; 502/417; 428/323; 428/327; 524/514; 524/515; 524/585; 524/586; 128/205.27; 55/524; 422/122; 422/177; 96/153
(58) Field of Search .................... 428/323, 327; 524/514, 515, 585, 586; 128/205.27; 502/159, 162, 401, 402, 413, 417; 55/524; 96/153; 422/122, 177

(56) References Cited

U.S. PATENT DOCUMENTS

| | | | | |
|---|---|---|---|---|
| 3,721,072 A | * | 3/1973 | Clapham | 96/153 |
| 4,013,566 A | * | 3/1977 | Taylor | 502/62 |
| 4,058,483 A | * | 11/1977 | Henbest | 502/413 |
| 4,178,161 A | * | 12/1979 | Rudner et al. | 55/524 |
| 4,528,281 A | * | 7/1985 | Sutt, Jr. | 502/402 |
| 4,917,857 A | * | 4/1990 | Jaeckel et al. | 419/9 |
| 5,064,534 A | * | 11/1991 | Busch et al. | 210/266 |
| 5,078,132 A | | 1/1992 | Braun et al. | 128/206.12 |
| 5,089,330 A | * | 2/1992 | Sato et al. | 428/323 |
| 5,721,187 A | * | 2/1998 | Ogawa et al. | 502/417 |
| 5,997,829 A | * | 12/1999 | Sekine et al. | 423/210 |
| 6,083,439 A | * | 7/2000 | Nastke et al. | 264/122 |

FOREIGN PATENT DOCUMENTS

| | | |
|---|---|---|
| DE | 2400 827 C3 | 7/1975 |
| DE | 34 43 900 A1 | 6/1986 |
| DE | 37 19 419 C2 | 12/1988 |
| DE | 38 13 564 A1 | 11/1989 |
| DE | 39 25 693 A1 | 2/1991 |
| DE | 91 15 610.6 | 5/1993 |
| DE | 41 40 455 A1 | 6/1993 |
| DE | 42 38 142 A1 | 5/1994 |
| DE | 195 14 887 A1 | 10/1996 |
| EP | 0 309 277 A2 | 3/1989 |
| EP | 0 492 081 A1 | 7/1992 |
| RO | 104021 | 7/1992 |
| WO | WO 94/03270 | 2/1994 |

* cited by examiner

Primary Examiner—Mark L. Bell
Assistant Examiner—Patricia L. Hailey
(74) Attorney, Agent, or Firm—Reed Smith LLP

(57) ABSTRACT

A polymer-bonded granular adsorptive, absorptive, chemisorptive, or catalytically active material and a process for producing molded bodies from this material. An objective was to develop a polymer-bonded granular adsorptive, absorptive, chemisorptive, or catalytically active material which is capable of forming an open-pore and sorptive foamed body at increased temperatures while not reducing the specific surface of the active material and with a binding effect only during the mixing and processing phases, as well as a process for producing molded bodies from this material. This objective was met by mixing and processing an adsorptive, absorptive, chemisorptive, or catalytically active fine-grained material together with a finely particulate, meltable polyethylene with the addition of a binding agent having an oligocondensate basis.

27 Claims, No Drawings

POLYMER-BONDED MATERIAL

This application is a divisional of application Serial No. 09/161,357, files Sep. 25, 1998, now U.S. Pat. No. 6,083,439.

FIELD OF THE INVENTION

The invention pertains to a polymer-bonded granular absorptive, adsorptive, chemisorptive, or catalytically active material, which is produced by mixing the absorptive, adsorptive, chemisorptive, or catalytically active fine-grained material with a finely particulate meltable polyethylene with the addition of a binding agent having an oligo-condensate basis (or backbone), as well as a process for producing molded bodies from this material.

BACKGROUND OF THE INVENTION

Molded filter bodies with an adsorptive effect based on activated carbon are known in the prior art. The following substances are used as matrices for the activated carbon:

open-pore foamed plastics phenoplasts polyurethanes plaster of paris paper substrates carbon networks (or carbon backbone)

The basic principle underlying inventions of this type is that of introducing activated carbons into the polymeric body or of forming a carbon matrix integral to the activated carbon itself (DE Al 41 40 455).

The solution described in DE C2 37 19 419 uses open-pore foamed plastic as the substrate material.

DE Al 39 25 693 suggests forming a three-dimensional matrix out of the carbon by coating it with a binding agent, but does not elaborate.

A similar solution is proposed in DE Al 38 135 64.

DE Al 41 40 455 describes a process for producing composite adsorbents which are characterized by high abrasion resistance and consist of highly porous inorganic filler materials and a chemically resistant and porous matrix. This is attained by carbonizing the water-soluble binding agent, e.g. preferably pitch acid.

DE Ul 91 15 610 also describes foamed plastics, preferably well foamed polyurethanes, into which the activated carbons are introduced.

According to EP Al 04 92 081, a mixture of cellulose, polyvinyl alcohol, and activated carbon is formed into a hexagonal body with a controlled pore size. The product is well suited for adsorbing aerial impurities, although it does not achieve satisfactory capacities.

DE Al 34 43 900 and DE C3 24 00 827 describe carbon-impregnated textiles and nonwoven fabrics. These solutions use special polymers with a polyurethane basis, e.g. polyurethane fluoride and polytetrafluoroethylene urethane.

The Romanian patent RO 10 40 21 also describes a porous polyurethane support material containing granulated activated carbon in its pores. The granular material is produced by impregnation with a solution of 15 to 20% activated carbon powder and 15% binding agent, which demonstrates that these capacities are not satisfactory either.

Interesting processes for producing molded bodies out of activated carbon for use in gas masks are claimed in U.S. Pat. No. 5,078,132, EP 03 09 277, and WO 94 03 270. These solutions describe a self-supporting porous gas filter material consisting of a molded body containing characteristically defined particles of the adsorptive material and the thermoplastic binding agent. The individual particles are fused into a molded filter body with open pores. It is characteristic of these solutions that the size of the binding particles is less than 20% of the average size of the adsorbent particles. The disadvantages are that satisfactory results with respect to air resistance and capacity are obtained only when thermoplastic polyurethane is used and that relatively high polymer components (ca. 20% of mass) are needed.

The disadvantages of prior art solutions lie in the fact that when the polymer and adsorbent particles are mixed, the phase distribution is always non-uniform for subsequent processing, and this has a strong adverse effect on the quality especially with respect to air resistance and product capacity.

Thermoplastic viscid polyurethanes are known for the technical difficulties associated with treating them and for an enormous cost factor in using them. The polymers generally make up 20% of the product's mass and melting them results in considerable coverage of the adsorbent surface, which leads to significant losses in capacity and an increase in volume resistance. Moreover, suitable spraying of the thermoplastic polyurethane on the activated product also covers the active surface to a not inconsiderable extent and thereby reduces capacity.

DE Al 195 14 887 describes a solution for producing an adsorptive, pliable, filter surface structure on the basis of a flexible surface structure and polyolefins, among other things, are specified but not elaborated upon for binding the adsorbent particles. On account of the textile substrate material, the solution is not suitable for producing molded bodies of different shapes and is not comparable with the solution of the present invention, which does not need substrate materials. The solution proposed in DE Al 42 38 142 contains porous bodies having adsorptive properties and mentions polyolefins as the binding agent but does not elaborate. The adsorbent particles and binding agent particles which it describes are of comparable sizes, so this does not compare with the solution of the present invention due to different separation problems.

A need has thus been recognized to develop a polymer-bonded granular adsorptive, absorptive, chemisorptive, or catalytically active material which is capable of forming an open-pore and sorptive foamed body at increased temperatures while not reducing the specific surface of the active material, and with a binding effect only during the mixing and processing phases, as well as a process for producing molded bodies from this material.

A need has also been recognized to develop an adsorptive, absorptive, chemisorptive, or catalytically active material and a technological process for producing molded bodies from this material which overcome the disadvantages of the prior art and achieve higher capacity, simpler processing, and minimized costs for at least the same degree of mechanical stability.

SUMMARY OF THE INVENTION

The aforementioned needs have been met with an unanticipated solution, in that a thermoplastic polymer with a slight amount of coverage on the surface of the active material was found along with a suitable binding agent by which optimal uniform distribution of the granular thermoplastic polymers in the active material is ensured and the polymer particles are bound to the granular active material for longer periods of processing, while minimizing the wetting of the material's active surface with the binding agent entering a chemically inert state during the hardening process and thus minimizing reduction in capacity for the active material.

Low-density polyethylene with a low melting point was determined by the invention to be a low-coverage thermoplastic polymer on active materials. The polyethylene enables a strong mechanical binding effect among the particles of the active material, allowing mechanical operations, such as sawing, grinding, drilling, etc., on the finished molded bodies.

The active surface of the active material is only minimally covered (<2% loss of specific surface). A polymer amount as low as 5% by mass of the active material enables sufficient mechanical stability of the molded bodies for certain uses. The problem of efficient uniform distribution of the thermoplastic polymers in the active material over long periods of processing was solved by using a fixing agent (or binding agent) having a modified amino resin oligocondensate basis (or backbone). A melamine resin precondensate partially etherified with methanol and modified and neutralized with triethanolamine is especially advantageous for wetting the thermoplastic polymers with the aminoplast, for binding to the active material while minimally wetting it, and for inert behavior following the thermal process. During the thermal treatment, the amino resin precondensate cross-links to a polymethylene melamine while forming an open-pore, foam-like polymer with good sorptive properties due to its high specific surface (up to 300 $m^2/g$). These sorptive properties extend to gases, ions, and other chemical species such as oils, solvents, etc.

The fixing or binding agent used thus contributes to the creation of sorptive surfaces. It is important to use binding systems which contain no organic solvents, i.e. to use water-dilutable amino resin precondensates.

If binding systems which contain organic solvents are used, the solvent components are instantaneously adsorbed on the active material, the binding or fixing components become dry, and the above-mentioned separation of components affects all subsequent processing. Water-dilutable systems, however, remain in a viscid, flowable state for at least 120 minutes and thus can be easily processed over this period of time.

Experiments were run, for example, in which low-pressure polyethylene in particulate form (e.g. $M_W$ 35,000; $M_N$ 7,700) with a melting point between 85 and 140° C. was mixed with a melamine resin precondensate in a suitable container with a stirring apparatus. When the polyethylene is thoroughly mixed and wetted with the amino resin precondensate, a granular activated carbon, for example, is added and intensive mixing continues until homogenous. The mixture is then passed into a suitable molding device and formed at low pressures and temperatures of approximately 100° C. During this procedure, the amino resin components foam, cross-link, and cure, and at the same time the polyethylene body melts as polymer bridges are formed between the individual grains of activated carbon. When cooled for a brief period of time and released from the mold, the result is a molded body which can undergo mechanical processing.

DESCRIPTION OF THE PRESENTLY PREFERRED EMBODIMENTS

The following examples are intended to illustrate but not limit the invention.

EXAMPLE 1

Producing a melamine resin precondensate. 279 ml of formalin (30% mass, aqueous) are brought to pH 9 with a diluted sodium hydroxide solution and heated to a temperature of 80° C. Then 63 grams of melamine (striaminotriazine) are added. The temperature rises to 94° C. during the reaction. When the melamine has been completely dissolved, the solution is cooled to 60° C. Here, clouding may occur due to methylol compound deposits. At 60° C., 270 ml of methanol and 1.6 ml of a hydrochloric acid and water mixture in a 1:1 ratio are added and allowed to reflux at this temperature for approximately 20 to 30 minutes. Then 6.3 grams of triethanolamine are added and a methanol-water mixture is distilled out azeotropically at 60° C. under vacuum conditions (approx. 15 torr) until a solid content of approx. 45% remains, after which 13.5 grams of urea are added for stabilization.

After cooling, the resulting precondensate can be stored very well and possesses the required properties for the purposes here described.

EXAMPLE 2

Producing the reaction mixture. In a suitable container with a stirring or agitation apparatus, e.g. 7.5 grams of polyethylene (fine-grained, melting point 90–95° C.) and 5 grams of the amino resin precondensate according to example 1 are subjected to intensive mixing. Then 150 grams of activated carbon are added and intensive mixing is continued until uniformity and good flow capacities are evident. The product is passed to a suitable device, heated to 110° C. and molded at a pressure of from 0.0125 to 0.25 $bar/cm^2$. This generates e.g. molded bodies with a height of between 25 and 50 mm depending on the molding pressure used and a diameter of 105 mm.

EXAMPLE 3

The procedure is the same as in example 2, but 15 grams of polyethylene are used.

EXAMPLE 4

The procedure is the same as in example 2, but 15 grams of amino resin precondensate are used.

It will be appreciated that the inventive chemical compositions described and covered herein can find a wide variety of uses. Such uses include, but are not limited to, use in gas masks, gas filters, air cleaners and air purifiers.

It will be appreciated that the inventive chemical compositions described and covered herein can serve a wide variety of functions, not the least of which is the filtering of gases, including the filtering of noxious gases.

In recapitulation, at least one presently preferred embodiment of the present invention broadly contemplates polymer-bonded granular adsorptive, absorptive, chemisorptive, or catalytically active material, characterized by the fact, that an adsorptive, absorptive, chemisorptive, or catalytically active fine-grained material is mixed with a finely particulate, meltable polyethylene with the addition of a binding agent having an oligocondensate basis and processed.

Additionally, at least one presently preferred embodiment of the present invention broadly contemplates polymer-bonded granular adsorptive, absorptive, chemisorptive, or catalytically active material characterized by the fact, that the finely particulate polyethylene which is used is preferably a low-density polyethylene.

Furthermore, at least one presently preferred embodiment of the present invention broadly contemplates polymer-bonded granular adsorptive, absorptive, chemisorptive, or catalytically active material characterized by the fact, that the finely particulate polyethylene has a melting range of 85 to 130° C., preferably 90 to 115° C.

Additionally, at least one presently preferred embodiment of the present invention broadly contemplates polymer-bonded granular adsorptive, absorptive, chemisorptive, or catalytically active material, characterized by the fact, that the finely particulate polyethylene has a particle size of from $\frac{1}{10}$ to $\frac{1}{2}$, preferably from $\frac{1}{8}$ to $\frac{1}{4}$, of the particle size of the granular adsorptive, absorptive, chemisorptive, or catalytically active material.

Furthermore, at least one presently preferred embodiment of the present invention broadly contemplates polymer-bonded granular adsorptive, absorptive, chemisorptive, or catalytically active material, characterized by the fact, that the polyethylene is added at 5 to 30%, preferably 7 to 20% of the mass of the granular adsorptive, absorptive, chemisorptive, or catalytically active material.

Additionally, at least one presently preferred embodiment of the present invention broadly contemplates polymer-bonded granular adsorptive, absorptive, chemisorptive, or catalytically active material, characterized by the fact, that the binding agent used is an amino resin precondensate.

Furthermore, at least one presently preferred embodiment of the present invention broadly contemplates polymer-bonded granular adsorptive, absorptive, chemisorptive, or catalytically active material, characterized by the fact, that the binding agent used is an aqueous amino resin precondensate modified with triethanolamine and methanol.

Additionally, at least one presently preferred embodiment of the present invention broadly contemplates polymer-bonded granular adsorptive, absorptive, chemisorptive, or catalytically active material, characterized by the fact, that the quantity of binding agent is 10 to 80%, preferably 30 to 50% of the mass of the polyethylene used.

Finally, but not necessarily exclusively, at least one presently preferred embodiment of the present invention broadly contemplates a process for producing molded bodies of a polymer-bonded granular adsorptive, absorptive, chemisorptive, or catalytically active material, characterized by the fact, that: the meltable polyethylene is intensively wetted with the oligocondensate in a suitable mixing container; the fine-grained adsorptive, absorptive, chemisorptive, or catalytically active material is added; the mixture undergoes intensive mixing; the mixture is conveyed via a suitable transport system to a processing machine; the mixture is formed into a body in the mold at temperatures of 90 to 180° C., preferably 100 to 140° C. and at pressures of 0.0125 to 0.25 bar/cm$^2$, preferably 0.0225 to 0.0625 bar/cm$^2$; the molded body is cooled in the mold and then released from the mold.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. The scope of the invention is defined by the following claims rather than the foregoing description. All changes which come within the meaning and range of equivalency of the claims are to be embraced within their scope.

What is claimed is:

1. Polymer-bonded granular adsorptive, absorptive, chemisorptive, or catalytically active material, wherein an adsorptive, absorptive, chemisorptive, or catalytically active fine-grained material is mixed with a finely particulate, meltable polyethylene with the addition of a binding agent distinct from said fine-grained material and said polyethylene, suitable for binding said polyethylene with said fine-grained material and having an oligocondensate basis, and processed via heating.

2. Polymer-bonded granular adsorptive, absorptive, chemisorptive, or catalytically active material according to claim 1, wherein the finely particulate polyethylene which is used is a low-density polyethylene.

3. Polymer-bonded granular adsorptive, absorptive, chemisorptive, or catalytically active material according to claim 2, wherein the finely particulate polyethylene has a melting range of 85 to 130° C.

4. Polymer-bonded granular adsorptive, absorptive, chemisorptive, or catalytically active material according to claim 3, wherein the finely particulate polyethylene has a particle size of from $\frac{1}{10}$ to $\frac{1}{2}$ of the particle size of the granular adsorptive, absorptive, chemisorptive, or catalytically active material.

5. Polymer-bonded granular adsorptive, absorptive, chemisorptive, or catalytically active material according to claim 4, wherein the polyethylene is added at 5 to 30% of the mass of the granular adsorptive, absorptive, chemisorptive, or catalytically active material.

6. Polymer-bonded granular adsorptive, absorptive, chemisorptive, or catalytically active material according to claim 5, wherein the binding agent used is an amino resin precondensate.

7. Polymer-bonded granular adsorptive, absorptive, chemisorptive, or catalytically active material according to claim 6, wherein the binding agent used is an aqueous amino resin precondensate modified with triethanolamine and methanol.

8. Polymer-bonded granular adsorptive, absorptive, chemisorptive, or catalytically active material according to claim 7, wherein the quantity of binding agent is 10 to 80% of the mass of the polyethylene used.

9. Polymer-bonded granular adsorptive, absorptive, chemisorptive, or catalytically active material according to claim 4, wherein the finely particulate polyethylene has a particle size of from $\frac{1}{8}$ to $\frac{1}{4}$ of the particle size of the granular adsorptive, absorptive, chemisorptive, or catalytically active material.

10. Polymer-bonded granular adsorptive, absorptive, chemisorptive, or catalytically active material according to claim 5, wherein the polyethylene is added at 7 to 20% of the mass of the granular adsorptive, absorptive, chemisorptive, or catalytically active material.

11. Polymer-bonded granular adsorptive, absorptive, chemisorptive, or catalytically active material according to claim 6, wherein the binding agent used is an amino resin precondensate.

12. Polymer-bonded granular adsorptive, absorptive, chemisorptive, or catalytically active material according to claim 8, wherein the quantity of binding agent is 30 to 50% of the mass of the polyethylene used.

13. Polymer-bonded granular adsorptive, absorptive, chemisorptive, or catalytically active material according to claim 3, wherein the finely particulate polyethylene has a melting range of 90 to 115° C.

14. Polymer-bonded granular adsorptive, absorptive, chemisorptive or catalytically active material according to claim 1, whereby less than 2% of the active surface of the adsorptive material is lost.

15. Polymer-bonded granular adsorptive, absorptive, chemisorptive or catalytically active material according to claim 1, wherein said binding agent is water-soluble.

16. Polymer-bonded granular adsorptive, absorptive, chemisorptive or catalytically active material according to claim 1, wherein said fine-grained material is adapted to bind to and filter filterable gases.

17. Polymer-bonded granular adsorptive, absorptive, chemisorptive or catalytically active material according to claim 16, wherein said fine-grained material comprises granular activated carbon.

18. Polymer-bonded material for assisting in the filtration of filterable gases, said material comprising an adsorptive, absorptive, chemisorptive or catalytically active fine-grained material that has been mixed with polyethylene, with the addition of a binding agent distinct from said fine-grained material and said polyethylene, suitable for binding said polyethylene with said fine-grained material, and processed via heating;

said fine-grained material being adapted to bind to and filter filterable gases.

19. The material according to claim 18, wherein said polyethylene comprises a finely particulate and meltable polyethylene.

20. The material according to claim 18, wherein said binding agent has an oligocondensate basis.

21. The material according to claim 18, whereby less than 2% of the active surface of the adsorptive material is lost.

22. The material according to claim 18, wherein said binding agent is water-soluble.

23. The material according to claim 18, wherein said polyethylene comprises a finely particulate, meltable polyethylene.

24. The material according to claim 23, wherein said fine-grained material comprises granular activated carbon.

25. Polymer-bonded granular adsorptive, absorptive, chemisorptive, or catalytically active material, wherein:

an adsorptive, absorptive, chemisorptive, or catalytically active fine-grained material is mixed with a finely particulate, meltable polyethylene with the addition of a binding agent having an oligocondensate basis and heated;

the finely particulate polyethylene which is used is a low-density polyethylene;

the finely particulate polyethylene has a melting range of 85 to 130° C.;

the finely particulate polyethylene has a particle size of from $\frac{1}{10}$ to $\frac{1}{2}$ of the particle size of the granular adsorptive, absorptive, chemisorptive, or catalytically active material;

the polyethylene is added at 5 to 30% of the mass of the granular adsorptive, absorptive, chemisorptive, or catalytically active material;

the binding agent used is an aqueous amino resin precondensate modified with triethanolamine and methanol; and the quantity of binding agent is 10 to 80% of the mass of the polyethylene used.

26. Polymer-bonded granular adsorptive, absorptive, chemisorptive or catalytically active material according to claim 25, wherein said fine-grained material is adapted to bind to and filter filterable gases.

27. Polymer-bonded granular adsorptive, absorptive, chemisorptive or catalytically active material according to claim 26, wherein said fine-grained material comprises granular activated carbon.

* * * * *